Jan. 21, 1936.    M. MAYEDA ET AL    2,028,680
DIGGER
Filed Feb. 4, 1935
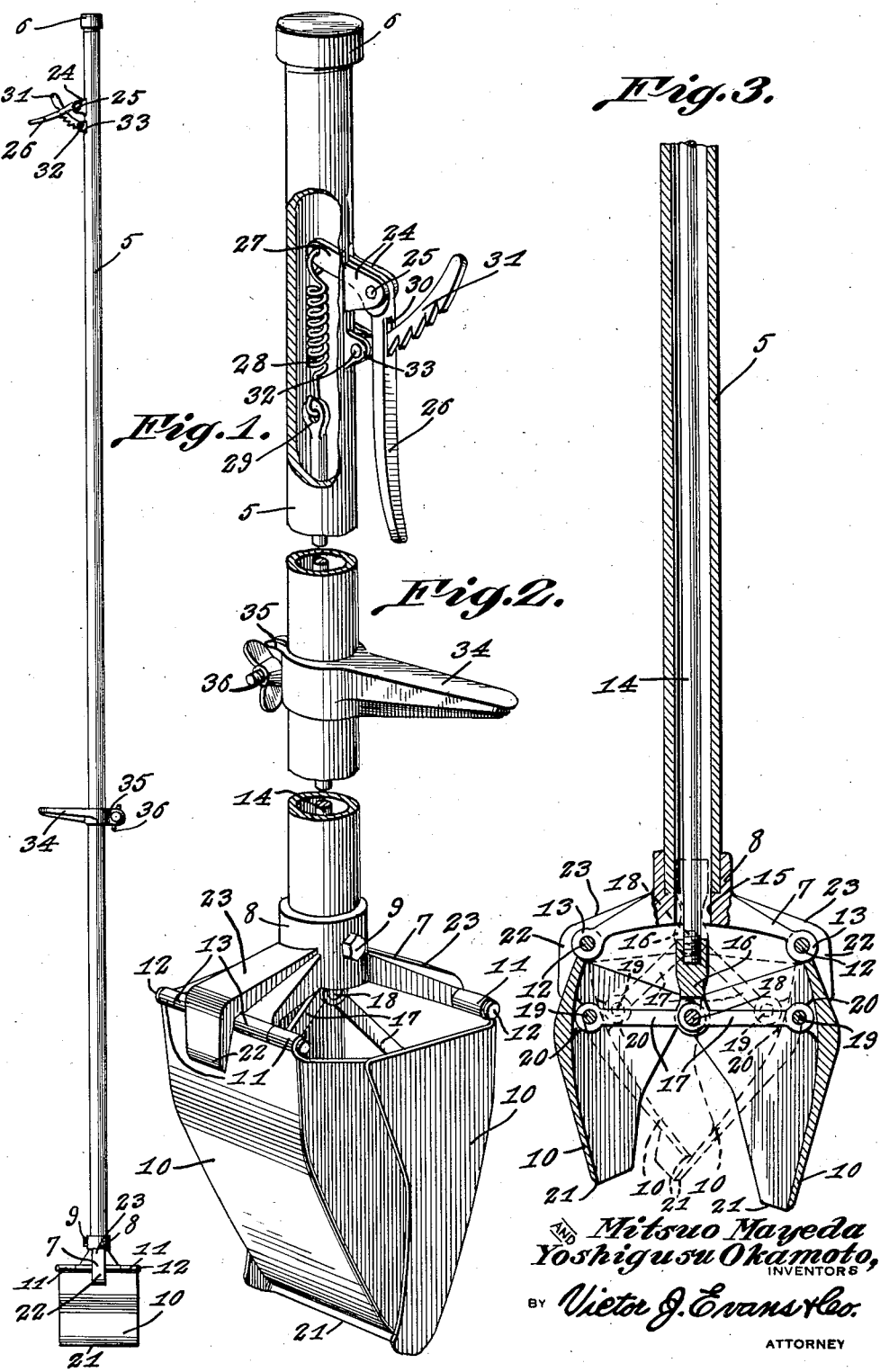
Mitsuo Mayeda
Yoshigusu Okamoto,
INVENTORS
BY Victor J. Evans & Co.
ATTORNEY Patented Jan. 21, 1936

2,028,680

UNITED STATES PATENT OFFICE 2,028,680

DIGGER

Mitsuo Mayeda and Yoshigusu Okamoto, Waialua, Territory of Hawaii

Application February 4, 1935, Serial No. 4,919

3 Claims. (Cl. 55—71)

This invention relates to an earth cutting implement and more especially to a digger, such as a post hole digger.

The primary object of the invention is the provision of an implement of this character wherein through the use of swingingly supported cooperating scoop members, earth can be cut and shoveled, in that the loose earth after cutting can be held by the scoop members as these may be locked in position for retaining the collected loose earth, the implement serving as a hole digger, as for example, a post hole digger.

Another object of the invention is the provision of an implement of this character, wherein the operating means for the closing of the scoop members can be latched or locked so that these members will be held against opening movement and when such scoop members are opened they operate as shovels and are disposed in cooperative opposite relation to each other, the implement being of a construction for manual handling and convenient for carriage or transportation by hand.

A further object of the invention is the provision of an implement of this character, which is simple in its construction, thoroughly reliable and efficient in its purpose, readily and easily handled, equipped with a foot pedal capable of adjustment for meeting the requirements of the user of the implement, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is an elevation of an implement constructed in accordance with the invention.

Figure 2 is a fragmentary perspective view of the same partly broken away at intervals and a portion being in section.

Figure 3 is a fragmentary vertical longitudinal sectional view showing by full lines the open position of the scoop members and by dotted lines closed position thereof.

Similar reference characters indicate corresponding parts throughout the several views in the drawing.

Referring to the drawing in detail, the implement of its kind comprises a tubular shank 5, preferably of uniform cross-sectional area throughout and of any desirable length providing a handle. In this instance, the shank 5 is made from a metal pipe carrying at one end a closure cap 6 removably threaded thereon, while at the other end is a double armed spider or hanger 7 having a medial circular socket portion 8 which receives the end next thereto of the shank 5 which is made secure in this portion by a fastener 9, or otherwise.

Cooperatively arranged in opposite relation to each other is a pair of scoop-like blades or members 10, these having pintle sleeves 11 at their heel ends for accommodating the pivot pintles 12 which are engaged in pintle sleeves 13 formed with the arms of the spider or hanger 7 for swingingly supporting the blades or members 10 from the said spider or hanger. These blades or members 10 operate as shovels for digging and collecting earth in a manner presently described.

Slidably fitted within the shank 5 is an actuator rod 14 which plays through a suitable guide opening 15 in the socketed portion 8 of the spider or hanger and at its lower end has connected therewith a lever coupling 16 to which are pivoted cooperating links or arms 17, the pivot connection being indicated at 18, which also are pivoted, at 19, to pivot ears 20 formed at the inner side of the blades or members 10. Through this rod 14 the blades or members 10 can be brought together or closed for the collecting and carrying of loose dirt had by the digging action of the same when in spread or open position with respect to each other. These blades or members 10 at their working ends are provided with cutting edges 21. The arms of the spider or hanger 7 are formed with stop lips 22 engaged by the blades or members 10 when spread apart to limit the spreading action of the opening of the same and such arms of said spider or hanger are slightly reversely inclined to form foot-engaging portions 23 so that the blades or members 10, by pressure from the foot of a person, can be forced into the earth for digging thereof when these members or blades are opened.

Provided on the shank 5 near the outer or uppermost end thereof is a bracket 24 having pivoted therein, at 25, an operating lever 26, the angular portion 27 of which extends into the shank and plays therein, while connected with this extension is a coiled retractile spring 28, it also being connected with an eye end 29 on the rod 14. The lever 26 has provided therein the slot 30 receiving a rack toothed curved latch 31 pivoted, at 32, to a bearing 33 and this latch will hold the lever 26 adjusted, particularly when shifted for the closing movement of the members or blades 10, while the spring 28 effects a tension on these members or blades when moved in a closing direction to avoid accidental release of the lever 26 from the latch when it is engaged therewith. However, the latch 31 can be shifted in the slot 30 to be ineffective for latching the lever 26 and thus permitting the opening of the blades or members 10, which, by their inherent weight and that of the connections with the rods 14, gravitate to open position with respect to each other.

In the use of the implement the same is adapted to be forced in the ground or earth when the members or blades 10 are open, thus cutting the earth, and when the latter has been cut the same can be collected and held by the members or blades 10 on the closing thereof, which may be latched in this closed position.

Adjustably fitted on the shank 5 is a foot stirrup or foot pedal 34, it having the clamping end 35 controlled by the winged nut-carrying bolt 36 for adjustment on the shank, the clamp 35 being in embracing engagement therewith and this stirrup or pedal 34 being usable by an operator of the implement through foot pressure to plunge or project the same into the earth or ground for digging.

What is claimed is:

1. An implement of the character described comprising a tubular shank, a hanger at one end of the shank and providing double arms oppositely extended, scoop blades pivotally supported on said arms and adapted for opening and closing movements relative to each other, means working within the shank and connected with the blades for effecting opening and closing thereof, means on the shank for latching said means connected with the blades, and a stirrup carried by the shank and adjustably connected therewith.

2. An implement of the character described comprising a tubular shank, a hanger at one end of the shank and providing double arms oppositely extended, scoop blades pivotally supported on said arms and adapted for opening and closing movements relative to each other, means working within the shank and connected with the blades for effecting opening and closing thereof, means on the shank for latching said means connected with the blades, a stirrup carried by the shank and adjustably connected therewith, and linkage between the first-named means and said blades.

3. An implement of the character described comprising a tubular shank, a hanger at one end of the shank and providing double arms oppositely extended, scoop blades pivotally supported on said arms and adapted for opening and closing movements relative to each other, means working within the shank and connected with the blades for effecting opening and closing thereof, means on the shank for latching said means connected with the blades, a stirrup carried by the shank and adjustably connected therewith, linkage between the first-named means and said blades, and a tensioning element included in the first-named means.

MITSUO MAYEDA.
YOSHIGUSU OKAMOTO.